US012759432B2

(12) United States Patent
Sorensen et al.

(10) Patent No.: US 12,759,432 B2
(45) Date of Patent: Oct. 13, 2026

(54) HOUSING FOR A SUNKEN ELECTRIC ROAD TRACK, A SUNKEN ELECTRIC ROAD TRACK AND A METHOD FOR ARRANGING A SUNKEN ELECTRIC ROAD TRACK ALONG A ROAD

(71) Applicant: ELONROAD AB, Lund (SE)

(72) Inventors: Andreas Sorensen, Lund (SE); Dan Zethraeus, Lund (SE)

(73) Assignee: ELONROAD AB, Lund (SE)

( * ) Notice: Subject to any disclaimer, the term of this patent is extended or adjusted under 35 U.S.C. 154(b) by 452 days.

(21) Appl. No.: 18/548,167

(22) PCT Filed: Feb. 22, 2022

(86) PCT No.: PCT/EP2022/054411
§ 371 (c)(1),
(2) Date: Aug. 28, 2023

(87) PCT Pub. No.: WO2022/184507
PCT Pub. Date: Sep. 9, 2022

(65) Prior Publication Data

US 2024/0140272 A1 May 2, 2024

(30) Foreign Application Priority Data

Mar. 1, 2021 (SE) .................................... 2150220-8

(51) Int. Cl.
*B60M 1/30* (2006.01)
*B60L 5/40* (2006.01)
*B60M 1/34* (2006.01)

(52) U.S. Cl.
CPC ............... *B60M 1/307* (2013.01); *B60L 5/40* (2013.01); *B60M 1/346* (2013.01); *B60M 1/302* (2013.01)

(58) Field of Classification Search
CPC ...... B60L 5/36; B60L 5/38; B60L 5/40; B60L 9/00; B60M 1/302; B60M 1/307; B60M 1/34; B60M 1/346; Y02T 10/70; Y02T 10/7072; Y02T 90/14
See application file for complete search history.

(56) References Cited

U.S. PATENT DOCUMENTS 4,129,203 A * 12/1978 Berman .................... B60L 5/40 191/4
5,960,717 A * 10/1999 Andre ....................... B60L 5/40 191/25

(Continued)

FOREIGN PATENT DOCUMENTS

CN 1188454 A 7/1998
CN 102821999 A 12/2012

(Continued)

OTHER PUBLICATIONS

Notice of Reason for Rejection mailed Oct. 24, 2025 from JP Application No. 2023-552551, 6 pages.

(Continued)

*Primary Examiner* — Jason C Smith
(74) *Attorney, Agent, or Firm* — Shih IP Law Group, PLLC

(57) ABSTRACT

A housing for a sunken electric road track configured to conductively provide electric power to a vehicle is presented. The housing comprising: a bottom plate extending in a longitudinal direction (L); opposing side walls protruding from the bottom plate; and opposing lateral flanges extending in the longitudinal direction (L), the opposing lateral flanges extending in the longitudinal direction (L) forming lateral protrusions for providing anchoring of the housing in a fixating mass used for fixating the housing in a groove of a roadway (40). Also, a sunken electric road track comprising such a housing is presented as well as a method for arranging a sunken electric road track along a road.

16 Claims, 3 Drawing Sheets

(56) References Cited

U.S. PATENT DOCUMENTS

| | | | | |
|---|---|---|---|---|
| 8,763,774 | B2 * | 7/2014 | Asplund | B60L 5/40<br>104/243 |
| 12,403,779 | B2 * | 9/2025 | Joao | H01M 10/44 |
| 2010/0175961 | A1 | 7/2010 | Rameau et al. | |
| 2015/0041273 | A1 * | 2/2015 | Klein | B60M 1/34<br>191/48 |
| 2015/0274035 | A1 | 10/2015 | Hourtane | |
| 2022/0299337 | A1 * | 9/2022 | Joao | B60L 53/665 |
| 2023/0090155 | A1 * | 3/2023 | Joao | B60L 1/02<br>701/22 |
| 2024/0140272 | A1 * | 5/2024 | Sorensen | B60M 1/34 |
| 2024/0308361 | A1 * | 9/2024 | James | B60L 50/60 |
| 2024/0317112 | A1 * | 9/2024 | Favaretto | B60L 50/66 |
| 2024/0351456 | A1 * | 10/2024 | Zethraeus | B60L 53/39 |

FOREIGN PATENT DOCUMENTS

| | | | | |
|---|---|---|---|---|
| CN | 205256056 U | | 5/2016 | |
| EP | 3253921 B1 | * | 5/2019 | E01B 9/60 |
| EP | 4292866 A1 | * | 12/2023 | B60L 53/16 |
| EP | 4434801 A1 | * | 9/2024 | B60K 1/04 |
| GB | 2522051 A | * | 7/2015 | B60L 5/38 |
| JP | S10-2034 Y | | 2/1935 | |
| JP | S4870212 A | | 9/1973 | |
| JP | S55127626 U | | 9/1980 | |
| JP | H07-215102 A | | 8/1995 | |
| JP | H08-104158 A2 | | 4/1996 | |
| JP | 2005-146539 A | | 6/2005 | |
| JP | 2025014119 A | * | 1/2025 | H01M 50/242 |
| WO | 2016/124910 A1 | | 8/2016 | |

OTHER PUBLICATIONS

Examination Report from Australian Application No. 2022229656 mailed Jul. 29, 2024, 5 pages.

International Search Report from International Application No. PCT/EP2022/054411, mailed date Jun. 22, 2022.

Office Action from CN Application No. 202280018001.1 issued Apr. 17, 2026, 10 pages (English Machine translation only).

* cited by examiner

HOUSING FOR A SUNKEN ELECTRIC ROAD TRACK, A SUNKEN ELECTRIC ROAD TRACK AND A METHOD FOR ARRANGING A SUNKEN ELECTRIC ROAD TRACK ALONG A ROAD

FIELD OF THE INVENTION

The present invention relates to provision of electric power to vehicles by means of electric road tracks, more specifically to a housing for a sunken electric road track, a sunken electric road track and a method for arranging a sunken electric road track along a road.

BACKGROUND ART

Electric vehicles are becoming ever more common, as traditional combustion engines are being replaced or combined with electric motors for reducing the dependence on fossil fuels for transportation. There is however a continuous ongoing effort to provide the infrastructure needed to reach the level of service that is present for combustion engine powered vehicles.

For instance, refueling a petrol- or diesel-powered vehicle takes only a matter of minutes while recharging the batteries of a corresponding electric vehicle may take up 40 or 50 minutes depending on the capacity of the batteries and of the charging station. Charging stations are also still less common than regular gas stations.

However, in order to avoid having to stop the electric vehicle for charging there has been developed various types of on-the-go charging methods. Providing electric power to a vehicle as it is moving provides not only the benefit of improved range but also in that the battery capacity can be reduced and thus also the weight of the vehicle.

One technique is providing overhead conductors along the road from which a vehicle may collect power. This solution is typically only suitable for one type of vehicle, most commonly heavy freight vehicles or busses.

Another technique is electric road tracks, which are attached to the surface of the road and from which the vehicle can collect power either conductively or inductively. Electric road tracks provide many benefits compared to overhead power conductors and are more versatile as they can be used for virtually any vehicle. They are however technically challenging due to being subjected to wear from vehicles, to road grime and also being subject to many safety concerns due to being in reach of pedestrians.

SUMMARY OF THE INVENTION

In view of that stated above, the object of the present invention is to provide a housing for a sunken electric road track, a sunken electric road track and a method for arranging a sunken electric road track in a groove in a road which ameliorates some of the problems with prior art solutions.

To achieve at least one of the above objects and also other objects that will be evident from the following description, a housing having the features defined in claim 1 is provided according to the teachings herein. Preferred embodiments of the device will be evident from the dependent claims.

More specifically, there is provided in a first aspect a housing for a sunken electric road track, the sunken electric road track being configured to conductively provide electric power to a vehicle. The housing comprising: a bottom plate extending in a longitudinal direction, opposing side walls protruding from the bottom plate and extending in the longitudinal direction, and opposing lateral flanges extending in the longitudinal direction forming lateral protrusions for providing anchoring of the housing in a fixating mass used for fixating the housing in a groove of a roadway. The housing provides a strong foundation and anchoring of the sunken electric road track to the roadway by the provision of the lateral flanges.

The opposing side walls may each comprise a lateral step extending in the longitudinal direction, such that an upper portion of the respective side wall is outwardly displaced in the lateral direction in relation to a bottom portion of the respective side wall. The lateral step providing support for a contact line structure which is configured to be arranged in the housing, which may be provided with corresponding lateral flanges which can be arranged in the space formed by the lateral step in the opposing side walls. Additionally, the lateral step provides a hollow space between the opposing lateral flanges and the lateral step which can be filled with the fixating mass and thus provides additional strength to the fixation of the housing in the groove.

In a second aspect is as a sunken electric road track provided which is configured to conductively provide electric power to a vehicle. The sunken electric road track comprises: a housing according to the first aspect extending along the sunken electric road track and being configured to be arranged in a groove formed in a roadway, a contact line structure extending along the housing, via which power collectors of the vehicle is configured to conductively draw electric power from the sunken electric road track, the contact line structure being arranged inside the housing, and a plurality of clamps configured to clamp the contact line structure to the housing for forming a plurality of friction joints between the housing and the contact line structure. The sunken electric road track provides an electric road track that can be arranged flush with the roadway top surface and which thus will not form any obstacle for instance for snowplows or for other vehicles. The provision of a housing fixated in a groove in the roadway and a separate contact line structure clamped thereto, where the contact line structure contains the electronics for electric power transfer, facilitates maintenance and assembly of the sunken electric road track. For instance, a broken contact line structure may simply be released by removing the clamps whereafter it can be lifted from the housing which can then receive a new or repaired contact line structure, thus allowing rapid repair and reducing down time. Moreover, the friction joints between the contact line structure and the housing allows some relative movement in the longitudinal direction which is beneficial as the two components may for instance be differently affected by temperature related elongation. Moreover, each housing may comprise more than one contact line structure.

A plurality of housings may be arranged one after the other along the longitudinal direction of the sunken electric road track. The sunken electric road track may further comprise drainage piping arranged below the bottom plates of the plurality of housings, the drainage piping comprising inlets arranged at joints between the plurality of housings. The water that enters the sunken electric road track can thus be collected at the joints, whereby it can be drained to a desired drainage outlet point by means of the drainage piping.

The sunken electric road track may further comprise a fixating mass filling a space between the housing and the groove formed in the roadway such that the housing is fixedly arranged in the groove.

The fixating mass may comprise a lower portion filling a space between the bottom plate of the housing and a bottom of the groove and surrounding the opposing lateral flanges of the housing, and an upper portion filling a space between the respective opposing side wall of the housing and a respective side wall of the groove, wherein the upper portion is arranged above the lower portion.

A composition of the fixating mass in the upper portion may be different from a composition of the fixating mass in the lower portion. This allows adaptation of the fixating mass to the differing environments to which the upper portion and the lower portion are subjected. A different composition of the upper portion may for instance be selected in surroundings where extreme high/low ambient temperatures are expected.

The composition of the fixating mass in the upper portion may be more flexible than the composition of the fixating mass in the lower portion. Having a more flexible composition of the fixating mass in the upper portion provides an improved sealing function for avoiding that water enters the groove or the space between the fixating mass and the housing. Moreover, the flexible upper portion of the fixating mass facilitates that the sunken electric road track can withstand the wear which is generated from vehicles travelling over/on the sunken electric road track.

The sunken electric may further comprise an electrically insulating layer arranged between the housing and the contact line structure. The electrically insulating layer reducing the risk of electric current occurring from the contact line structure to the housing.

In a third aspect is a method for arranging a sunken electric road track along a road provided. The method comprises arranging a housing of the sunken electric road track in a groove formed in a roadway of the road, such that a space is formed between a bottom plate of the housing and a bottom of the groove and between opposing side walls of the housing and respective side walls of the groove; and filling the space with a fixating mass.

The filling the space with a fixating mass may comprise filling a lower portion filling a space between the bottom plate of the housing and the bottom of the groove and surrounding the opposing lateral flanges extending in a longitudinal direction forming lateral protrusions for providing anchoring of the housing with fixating mass of a first composition; and filling an upper portion filling a space between the respective opposing side wall of the housing and a respective side wall of the groove with fixating mass of a second composition, wherein the upper portion is arranged above the lower portion, and wherein the second composition of the fixating mass in the upper portion is different from the first composition of the fixating mass in the lower portion. The fixating mass lower portion providing a robust fixation of the housing in the groove as it extends above and surrounding the opposing lateral flanges thereof, while the upper portion of the fixating mass can be provided with a composition having properties suitable for the current environment in which the sunken electric road track is to be arranged and for instance provide reduced risk of water seeping into the groove.

The method may further comprise arranging a contact line structure the sunken electric road track inside the housing, via which contact line structure power collectors of a vehicle are configured to conductively draw electric power from the sunken electric road track; and clamping the contact line structure to the housing using a plurality of clamps for forming a plurality of friction joints between the housing and the contact line structure.

The method may further comprise arranging an electrically insulating layer between the housing and the contact line structure.

The method (may further comprise arranging a plurality of housings one after the other along a longitudinal direction of the sunken electric road track, and arranging drainage piping below the bottom plates of the plurality of housings, the drainage piping comprising inlets arranged at joints between the plurality of housings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
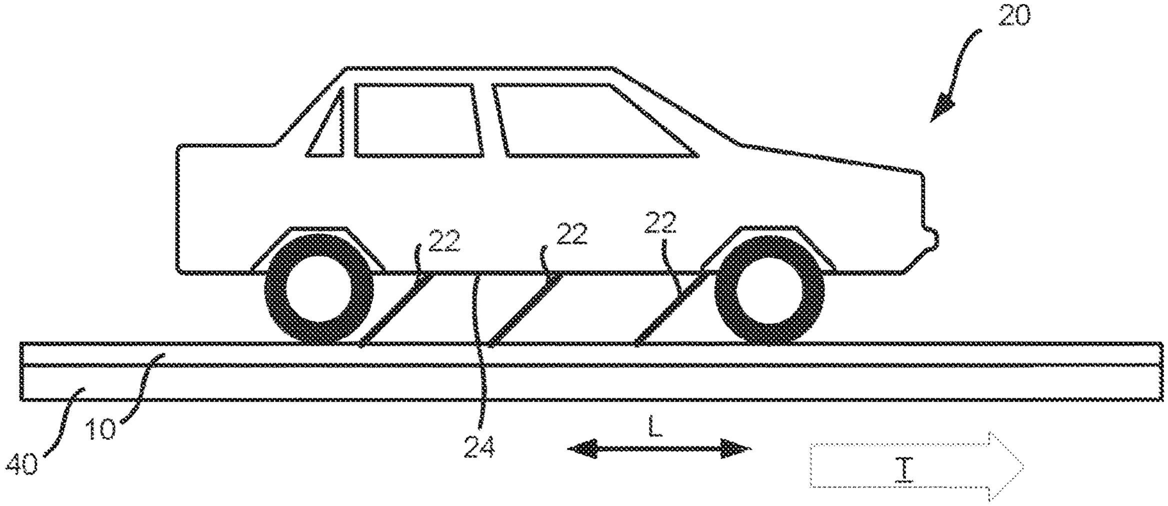
FIG. 1 discloses a side view of a sunken electric road track.

FIG. 1 discloses a sunken electric road track 10 which is configured to conductively provide electric power to a vehicle 20. The vehicle 20 is illustrated as a car but the teachings herein are applicable to electric road tracks 10 for other vehicles as well, such as for trucks, busses etc. A sunken electric road track 10 is to be considered as an electric road track 10 that is configured to be arranged such that it is essentially level with the surrounding surface of a roadway 40 to which it is attached.

The vehicle 20 may be provided with one or more power collectors 22, three are illustrated but other numbers of power collectors 22 also possible. The power collectors 22 are configured to be placed in contact with the sunken electric road track 10, more specifically with a contact line structure 200 (shown in FIG. 5) thereof. The power collectors 22 may be arranged on an underside 24 of the vehicle 20.

Figure 2:
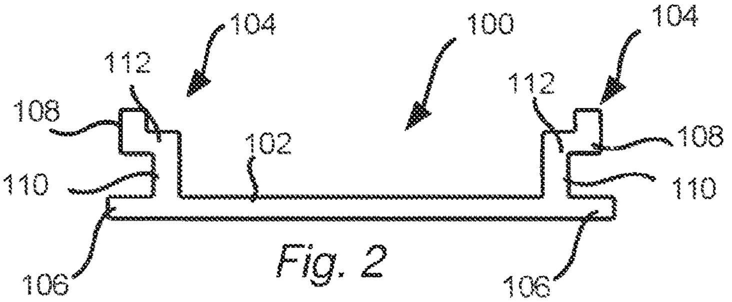
FIG. 2 discloses a cross-section view of a housing for a sunken electric road track.

The sunken electric road track 10 comprises a housing 100 which is shown in a cross-sectioned view in FIG. 2. The housing 100 is configured to accommodate the contact line structure 200, such that the contact line structure 200 can be easily removed from the housing 100 for instance for maintenance or for replacement thereof. More than one contact line structure 200 may be arranged in each housing 100.

The housing 100 may be made from a corrosion resistant metal or metal alloy such as aluminum, stainless steel etc. Other materials are also considered such as polymer materials and composite materials. The housing 100 is preferably formed in one piece for instance in an extrusion manufacturing process. The housing 100 is configured to be arranged in a groove 42 (shown in FIGS. 6-8) formed in a roadway 40. The housing 100 comprises a bottom plate 102 extending in a longitudinal direction L, the longitudinal direction L extending along the length of the housing 100 and the roadway 40.

The housing 100 further comprises opposing side walls 104 protruding in an upwardly direction from the bottom plate 102 and extending in the longitudinal direction L. Opposing lateral flanges 106 are also provided to the housing 100, the opposing lateral flanges 106 extending in the longitudinal direction L and forming lateral protrusions for providing anchoring of the housing 100 in a fixating mass 30 used for fixating the housing 100 in the groove 42 of the roadway 40. The flanges 106 may have a height of between 3 mm to 8 mm, preferably approximately 5 mm. Moreover, the flanges 106 may protrude laterally between 5 mm and 15 mm, preferably approximately 10 mm from a bottom portion 110 of the respective opposing side wall 104. The bottom portion 110 of each opposing side wall 104 is the portion thereof that is adjacent and connecting to the bottom plate 102.

The opposing lateral flanges 106 may be configured to protrude laterally past a respective upper portion 108 of the opposing side walls 104. The opposing lateral flanges 106 being arranged in a fixating mass 30 provides a secure and robust connection which fixates the housing 100 in the groove 42 in the roadway 40.

As is illustrated in FIG. 2, the opposing side walls 104 may each comprise a lateral step 112 extending in the longitudinal direction L, such that the upper portion 108 of the respective side wall 104 is outwardly displaced in the lateral direction in relation to the bottom portion 110 of the respective side wall 104. The lateral step 112 may form a support surface providing vertical support for the contact line structure 200, which may be provided with corresponding opposing lateral flanges 202 which are configured to be arranged directly or indirectly against the lateral step 112. An example of indirect in this context is if an electrically insulating layer 70 is arranged on the contact line structure 200.

Figure 3:
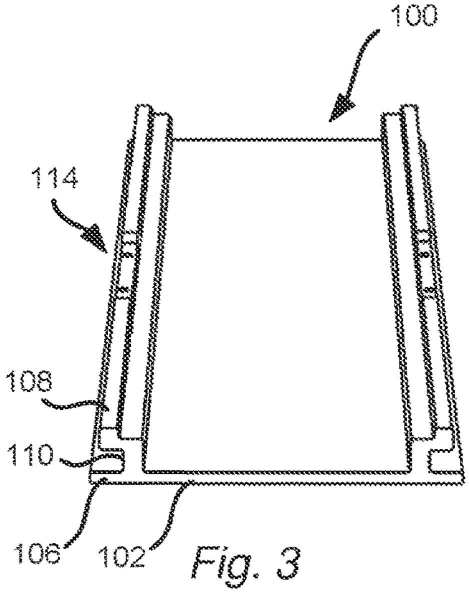
FIG. 3 discloses a perspective view of a housing for a sunken electric road track.
Figure 4:
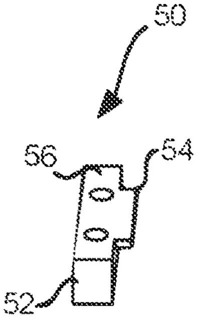
FIG. 4 discloses a perspective view of a clamp for a sunken electric road track.
Figure 5:
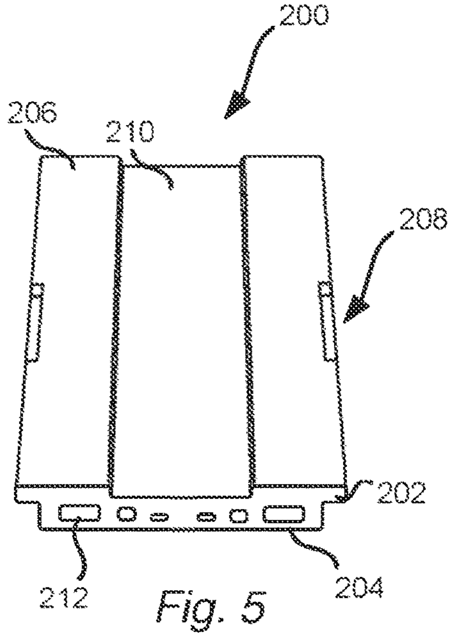
FIG. 5 discloses a perspective view of a contact line structure for a sunken electric road track.

Turning now to FIGS. 3 to 5, in which a perspective views of a respective embodiment of the housing 100, of a clamp 50 and of the contact line structure 200 is shown. In FIG. 3, a segment of a housing 100 is shown. The housing 100 may be provided with a plurality of recesses 114 each of which being configured to receive a respective clamp 50.

The clamp 50 is configured to clamp the contact line structure 200 to the housing 100 for forming a plurality of friction joints between the housing 100 and the contact line structure 200. Each friction joint is sufficiently strong to hold the contact line structure 200 in place in the housing 100 but may permit relative movement to a certain extent in the longitudinal direction L of the contact line structure 200 in relation to the housing 100. The contact line structure 200, which forms a housing for holding electronic components for power transfer from the sunken electric road track 10 to the vehicle 20, may be more subject to elongation/expansion due to temperature variations than the housing 100 as it is exposed to the environment whereas the housing 100 is arranged in the groove 42 and thus subject to a different temperature. The friction joints formed by the clamps 50 will allow accommodation of such relative movement/elongation/expansion between the contact line structure 200 and the housing 100.

The clamp 50 may comprise a body portion 52 which is configured to be arranged in the recess 114, the recess 114 being formed in the upper portion 108 of the opposing side walls 104. The clamp 50 may configured to be attached to the recess 114 for instance by means of one or more suitable fasteners such as a screw.

The clamp 50 may however be embodied in other forms as well and be attached to a housing 100 which is not provided with a recess 114. For instance, a flat clamp 50 is envisioned which is attached to upper portion 108 of each opposing side wall 104 and which is configured to clamp the contact line structure 200 to the housing 100.

Additionally, the clamp 50 may be configured to be attached to the housing 100 on the lateral step 112 inside of the upper portion 108 of each opposing side wall 104, which would not require any recess 114 to have to be formed in the housing 114 for accommodating the clamp 50.

The contact line structure 200 may be provided with a plurality of recesses 208 which a respective clamp 50 is configured to cooperate with in order to clamp the contact line structure 200 to the housing 100. Each clamp may be provided with a lateral protrusion 54 which is configured to be arranged in a respective recess 208 in the contact line structure 200. In order for allowing movement in the longitudinal direction of the contact line structure 200 in relation to the housing 100, the recesses 208 in the contact line structure 200 may have an extension in the longitudinal direction L which is larger than the longitudinal extension of the lateral protrusion 54 on each clamp 50.

The clamp 50 is preferably manufactured from a non-conductive material such as a polymer material, to avoid electrical conduction from the contact line structure 200 to the housing 100.

While only two recesses 114, 208 are shown in the housing 100 and in the contact line structure 200 respectively, it is to be realized that a plurality of recesses 114, 208 may be formed along the length of the housing 100 and the contact line structure 200 respectively.

The contact line structure 200, which as mentioned is configured to house electronic components for the power transmission to the vehicle 20, may comprise one or more channels 212. The channels 212 may be configured to hold electrical conductors such as copper conductors or other electrical components. Moreover, the contact line structure 200 may comprise a recess 210 which extends in the longitudinal direction L and into which a plurality of segments of a contact line (not shown) can be arranged from which the power collector(s) 22 of the vehicle 20 is configured to draw electric power.

Preferably, the contact line structure 200 is manufactured from the same material as the housing 100, i.e. a corrosion resistant metal or metal alloy such as aluminum, stainless steel etc. Other materials are also considered such as polymer materials and composite materials. The contact line structure 200 is preferably formed in one piece for instance in an extrusion manufacturing process.

An upper surface 206 of the contact line structure 206 is configured to be arranged essentially in level with the surface of the surrounding roadway 40. A bottom surface 204 of the contact line structure 200 is configured to be arranged directly or indirectly abutting against the bottom plate 102 of the housing 100.

Figure 6:
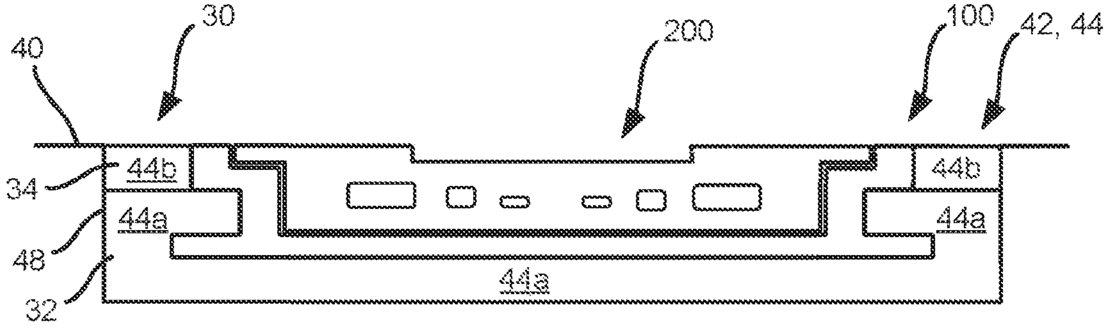
FIG. 6 discloses a cross-section view of a sunken electric road track.

Turning now to FIG. 6 which shows the sunken electric road track 10 in a cross-sectioned view as it is arranged in a groove 42 in a roadway 40. The groove 40 may as is illustrated in FIG. 6 be larger than the housing 100. This facilitates the filling of the fixating mass 30 which is intended to surround the exterior of the housing 100 filling a space 44 between the groove 42 and the housing 100.

Preferably, the width of the groove 42 is 2 cm to 5 cm larger than the width of the housing 100. The depth of the groove 42 is preferably 1 cm to 2 cm deeper than the corresponding height of the housing 100.

The fixating mass 30 is preferably a bituminous fixating mass which can be liquified for instance by heating, whereby it can be poured in the groove 42 where it may cool and settle around the housing 100, fixating it in place in the groove 42.

The fixating mass 30 may comprise a lower portion 32 which fills a lower space 44*a* between the bottom plate 102 of the housing 100 and a bottom 46 of the groove 42 and surrounding the opposing lateral flanges 106 of the housing 100.

The fixating mass 30 may further comprise an upper portion 34 filling an upper space 44*b* between the respective opposing side wall 104 of the housing 100 and a respective side wall 48 of the groove 42. The upper portion 34 may constitute the uppermost 30 mm to 10 mm, preferably approximately 20 mm of the fixating mass 30.

The composition of the fixating mass 30 in the upper portion 34 may differ from the composition of the fixating mass in the lower portion 32, preferably such that the fixating mass 30 in the upper portion 34 is more flexible and elastic than the fixating mass 30 in the lower portion 32. The more flexible upper portion 34 of the fixating mass 30 facilitates accommodating movement in the sunken electric road track 10 due to heat expansion/elongation as well as reducing the risk of water entering the groove 42. The composition of the fixating mass 30 in the upper portion 34 may further be adapted to suit the environment in which the sunken electric road track 10 is arranged.

Figure 7:
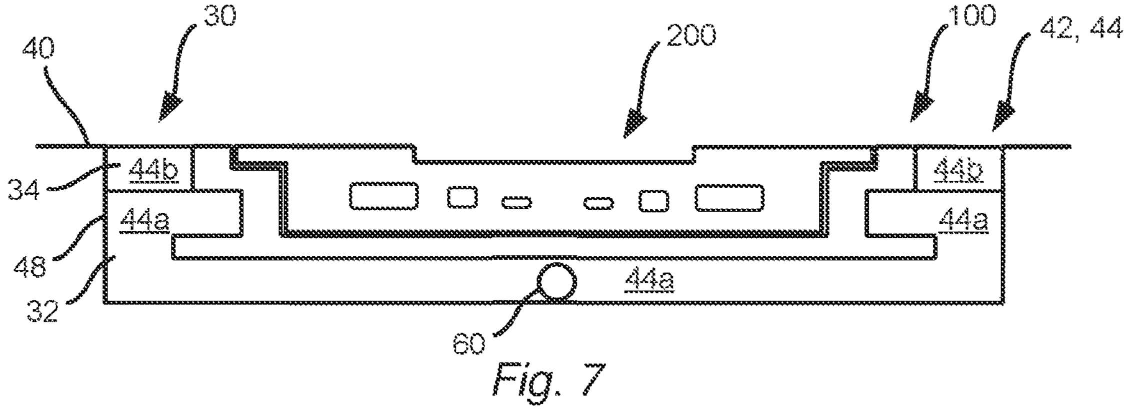
FIG. 7 discloses a cross-section view of a sunken electric road track.
Figure 9:
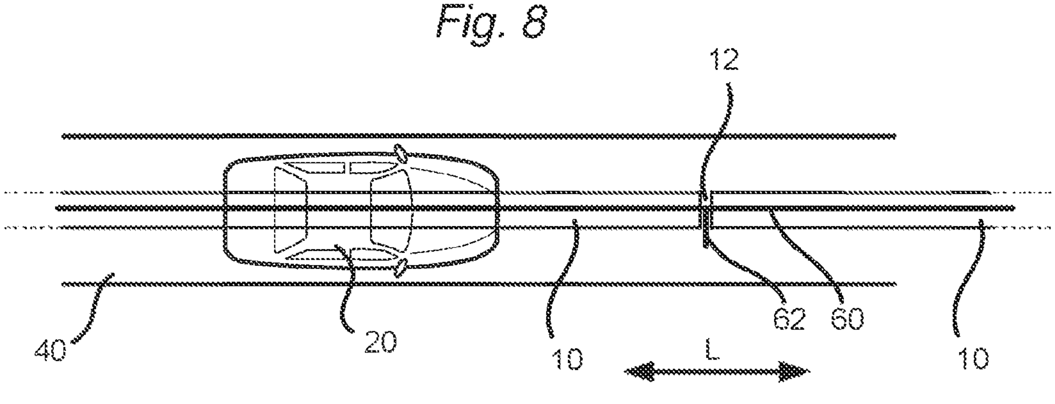
FIG. 9 discloses a top view of a sunken electric road track.

A plurality of housings 100 may be arranged one after the other along the longitudinal direction L of the sunken electric road track 10, for instance in one long groove 42 formed in the roadway 40. As is illustrated in FIG. 7, the sunken electric road track 10 may comprise drainage piping 60 arranged below the bottom plate 102 of the plurality of housings 100. The drainage piping 60 may be a silicone tube which is molded into the fixating mass 30 below the bottom plate 102 of the housing 100. The drainage piping 60 is configured to evacuate excess water that may reach into the housing 100 or the contact line structure 200 or into the lower space 44*a* below the housing 100. As is illustrated in FIG. 9, the drainage piping 60 may for this purpose comprise inlets 62 arranged at joints 12 between the plurality of housings 100 in positions where the water collects and can be drained by means of the drainage piping 60. Water that enters the sunken electric road track 10 is thus led to joints 12 between a plurality of housings 100 or at one end of the sunken electric road track 10, from which it can enter the drainage piping 60.

The drainage piping 60 may thus naturally also comprise one or more outlets through which the water can be drained, for instance to a storm water drain.

Figure 8:
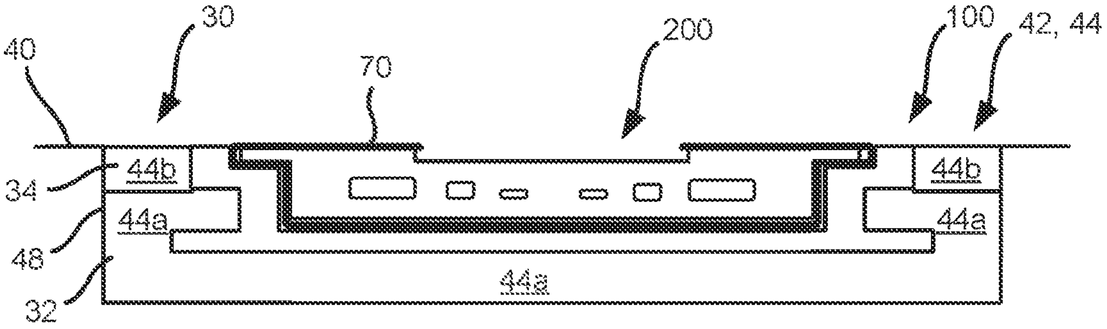
FIG. 8 discloses a cross-section view of a sunken electric road track.

Moreover, as illustrated in FIG. 8, an electrically insulating layer 70 may be arranged between the housing 100 and the contact line structure 200. The electrically insulating layer 70 may be formed out of a suitable electrically insulating material, preferably from a flexible and durable material. For instance, it may be formed from an elastomeric and/or polymeric material such as rubber, silicone etc.

The electrically insulating layer 70 provides electrical separation between the housing 100 and the contact line structure 200.

Figure 10A:
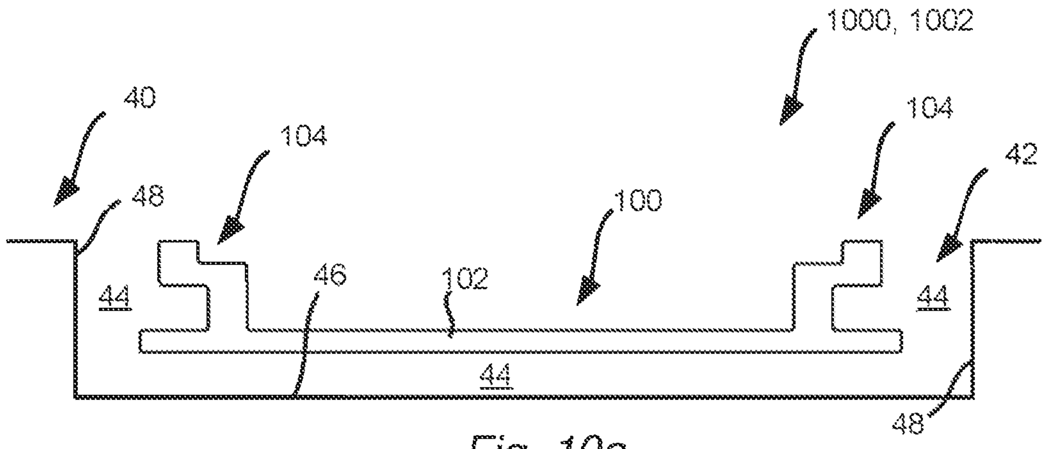
FIGS. 10*a*-10*d* disclose a method for arranging a sunken electric road track along a road.

Turning now to FIGS. 10*a*-10*d* which shows the steps 1002, 1004, 1004*a*, 1004*b* of a method 1000 for arranging a sunken electric road track 10 along a road. In FIG. 10*a*, the arranging 1002 of a housing 100 of the sunken electric road track 10 in a groove 42 formed in a roadway 40 of the road is shown. The housing 100 is arranged 1002 such that a space 44 is formed between a bottom plate 102 of the housing 100 and a bottom 46 of the groove 42 and between opposing side walls 104 of the housing 100 and respective side walls 48 of the groove 42. For the purpose may one or several holders (not shown) be provided which supports and suspends the housing 100 in its desired position in the groove 42.

Figure 10B:
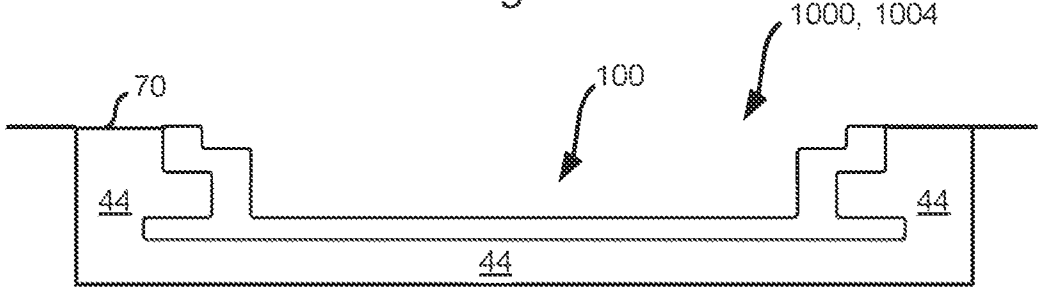

Once the housing 100 is in its desired position, the method 1000 further comprises filling 1004 the space 44 with a fixating mass 30 which is illustrated in FIG. 10*b*. The fixating mass 30, which preferably is a bituminous fixating mass 30, is preferably heated such that it is liquified. It may thereafter be poured into the space 44 in the groove 42 until it entirely fills the space 44 and becomes flush with the roadway 40 top surface. The fixating mass 30 will subsequently cool and solidify, whereby the housing 100 is secured in place and the holders can be removed.

Figure 10C:
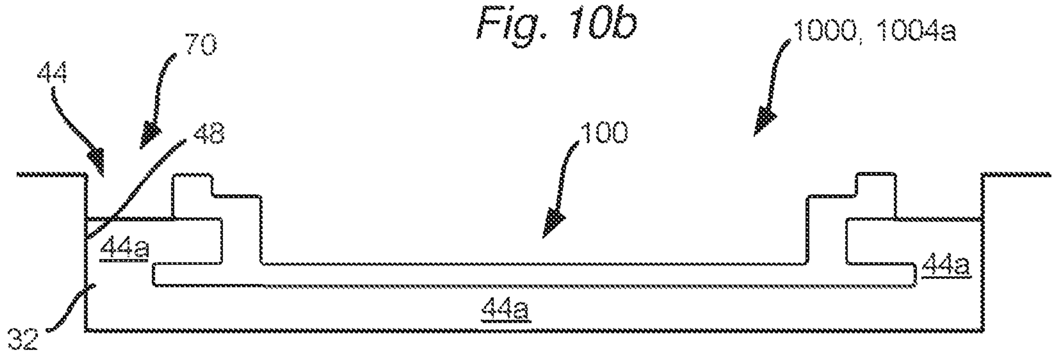
Figure 10D:
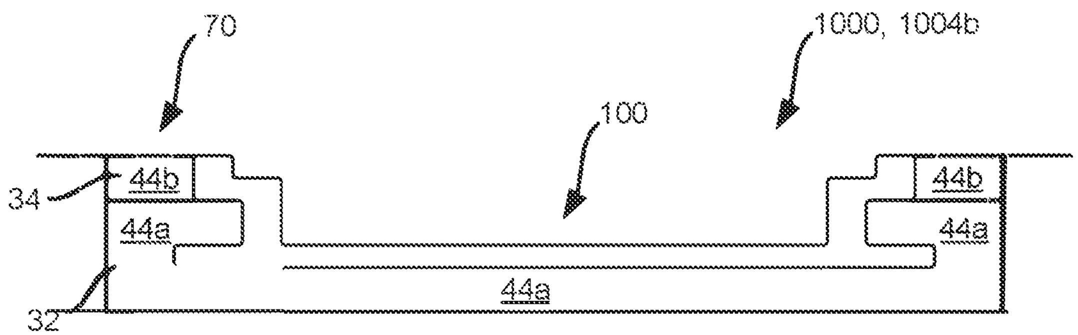

As illustrated in FIGS. 10*c* and 10*d*, the fixating mass 30 may comprise a lower portion 32 and an upper portion 34. The step of filling 1004 may thus comprise, as shown in FIG. 10*c*, filling 1004*a* a lower portion 32 filling a space 44*a* between the bottom plate 102 of the housing 100 and the bottom 46 of the groove 44 and surrounding the opposing lateral flanges 104 of the housing 100. The lower portion 32 of the fixating mass 32 may then optionally be allowed to at least partially cool and solidify, after which the method 1000 may further comprise filling 1004*a* an upper portion 34 filling a space 44*b* between the respective opposing side wall 104 of the housing 100 and a respective side wall 48 of the groove 42. The upper portion 34 of the fixating mass 30 can thus be provided with differing material properties than the lower portion 32, which may be desired as they to some extent serve different purposes. The lower portion 32 provides the majority of the strength to the bond between the housing 100 and the groove 42 and should thus have a composition that makes the fixating mass 30 therein relatively rigid and strong. The upper portion 34 is subjected to the weather and to the wear from vehicles travelling on the road, and can thus comprise a fixating mass 30 having a more flexible material composition that provides a better seal against water and which allows more movement without releasing from the groove 42. The upper portion 34 is preferably configured to be essentially flush with the surrounding top surface of the roadway 40.

Additionally, the method 1000 may further comprise arranging the drainage piping 60 in the groove 42 below the bottom plate 102 of the housing 100 as is illustrated in FIGS. 7 and 9.

The method 1000 may further comprise arranging the contact line structure 200 in the housing 100, the contact line structure 200 being optionally beforehand provided with an electrically insulating layer 70 as is shown in FIG. 8. The contact line structure 200 may subsequently be clamped by means of a plurality of clamps 50 to the housing 100, whereby a number of friction joints are formed between the contact line structure 200 and the housing 100.

It will be appreciated that the present invention is not limited to the embodiments shown. Several modifications and variations are thus conceivable within the scope of the invention which thus is exclusively defined by the appended claims.

The invention claimed is:

1. A housing for a sunken electric road track configured to conductively provide electric power to a vehicle, the housing comprising:

a bottom plate extending in a longitudinal direction, opposing side walls protruding from the bottom plate and extending in the longitudinal direction, opposing lateral flanges extending in the longitudinal direction forming lateral protrusions for providing anchoring of the housing in a fixating mass used for fixating the housing in a groove of a roadway, wherein the respective opposing flange protrude from a bottom portion of the respective opposing side wall, the bottom portion of each opposing side wall is the portion thereof that is adjacent and connecting to the bottom plate.

2. The housing according to claim 1, wherein the opposing side walls each comprises a lateral step extending in the longitudinal direction, such that an upper portion of the respective side wall is outwardly displaced in the lateral direction in relation to a bottom portion of the respective side wall.

3. The housing according to claim 2, wherein the respective opposing lateral flange protrude laterally past the respective upper portion of the opposing side walls.

4. A sunken electric road track configured to conductively provide electric power to a vehicle, the sunken electric road track comprising:

a housing according to claim 1 extending along the sunken electric road track and being configured to be arranged in a groove formed in a roadway, a contact line structure extending along the housing, via which power collectors of the vehicle is configured to conductively draw electric power from the sunken electric road track, the contact line structure being arranged inside the housing, a plurality of clamps configured to clamp the contact line structure to the housing for forming a plurality of friction joints between the housing and the contact line structure, the plurality of friction joints being configured to permit longitudinal expansion of the contact line structure relative to the housing.

5. The sunken electric road track according to claim 4, comprising a plurality of housings arranged one after the other along the longitudinal direction of the sunken electric road track, further comprising drainage piping arranged below the bottom plates of the plurality of housings, the drainage piping comprising inlets arranged at joints between the plurality of housings.

6. The sunken electric road track according to claim 4, further comprising a fixating mass filling a space between the housing and the groove formed in the roadway such that the housing is fixedly arranged in the groove.

7. The sunken electric road track according to claim 6, wherein the fixating mass comprises a lower portion filling a space between the bottom plate of the housing and a bottom of the groove and surrounding the opposing lateral flanges of the housing, an upper portion filling a space between the respective opposing side wall of the housing and a respective side wall of the groove, wherein the upper portion is arranged above the lower portion.

8. The sunken electric road track according to claim 7, wherein a composition of the fixating mass in the upper portion is different from a composition of the fixating mass in the lower portion.

9. The sunken electric road track according to claim 8, wherein the composition of the fixating mass in the upper portion is an elastomeric sealant composition and the composition of the fixating mass in the lower portion is a rigid structural anchoring composition.

10. The sunken electric road track according to claim 4, further comprising an electrically insulating layer arranged between the housing and the contact line structure.

11. A method for arranging a sunken electric road track along a road, the method comprising:

arranging a housing of the sunken electric road track in a groove formed in a roadway of the road, the housing comprising a bottom plate, opposing side walls, and opposing lateral flanges protruding from a bottom portion of the opposing side walls, such that a space is formed between a bottom plate of the housing and a bottom of the groove and between opposing side walls of the housing and respective side walls of the groove, and filling the space with a fixating mass by pouring liquified fixating mass into the space, wherein the filling the space with a fixating mass comprises:

filling a lower portion of the space, between the bottom plate of the housing and the bottom of the groove and surrounding opposing lateral flanges extending in a longitudinal direction forming lateral protrusions for providing anchoring of the housing, with a fixating mass of a first composition, and filling an upper portion of the space, between the respective opposing side wall of the housing and a respective side wall of the groove, with a fixating mass of a second composition, wherein the upper portion is arranged above the lower portion, and wherein the second composition of the fixating mass in the upper portion is different from the first composition of the fixating mass in the lower portion.

12. The method according to claim 11, wherein the second composition of the fixating mass in the upper portion is an elastomeric sealant composition and the first composition of the fixating mass in the lower portion is a rigid structural anchoring composition.

13. The method according to claim 11, further comprising:

arranging a contact line structure of the sunken electric road track inside the housing, via which contact line structure power collectors of a vehicle are configured to conductively draw electric power from the sunken electric road track; and clamping the contact line structure to the housing using a plurality of clamps for forming a plurality of friction joints between the housing and the contact line structure, the plurality of friction joints being configured to permit longitudinal expansion of the contact line structure relative to the housing.

14. The method according to claim 13, further comprising arranging an electrically insulating layer between the housing and the contact line structure.

15. The method according to claim 11, further comprising:

arranging a plurality of housings one after the other along a longitudinal direction of the sunken electric road track, and arranging drainage piping below the bottom plates of the plurality of housings, the drainage piping comprising inlets arranged at joints between the plurality of housings.

16. The method according to claim 11, wherein the fixating mass is a bituminous fixating mass.

* * * * *